United States Patent
Shimura et al.

(10) Patent No.: US 9,845,402 B2
(45) Date of Patent: Dec. 19, 2017

(54) OIL-BASED INKJET INK SET AND METHOD FOR PRODUCING PRINTED ITEM

(71) Applicant: RISO KAGAKU CORPORATION, Tokyo (JP)

(72) Inventors: Shinichiro Shimura, Ibaraki (JP); Toshihiro Endo, Ibaraki (JP); Akiko Yamamoto, Ibaraki (JP)

(73) Assignee: RISO KAGAKU CORPORATION, Tokyo (JP)

(*) Notice: Subject to any disclaimer, the term of this patent is extended or adjusted under 35 U.S.C. 154(b) by 0 days.

(21) Appl. No.: 15/443,501

(22) Filed: Feb. 27, 2017

(65) Prior Publication Data

US 2017/0253756 A1    Sep. 7, 2017

(30) Foreign Application Priority Data

Mar. 4, 2016    (JP) .................................. 2016-041870

(51) Int. Cl.
  *C09D 11/36*    (2014.01)
  *B41J 2/01*    (2006.01)

(52) U.S. Cl.
  CPC ................. *C09D 11/36* (2013.01); *B41J 2/01* (2013.01)

(58) Field of Classification Search
  CPC ... B41J 2/01; B41J 2/211; B41J 2/1433; B41J 2/17; B41J 2/17593; B41J 2/2107; B41J 2/1755; B41J 2/2114; B41J 2/2117; B41J 2/0057; B41J 2/04598; B41J 2/04586; B41J 2/14274; B41J 2/04588; B41J 2/04595; B41J 11/0015; B41J 11/002; B41M 5/0011; B41M 5/0017; B41M 5/52;
  (Continued)

(56) References Cited

U.S. PATENT DOCUMENTS 7,060,125 B2    6/2006    Ohkawa et al.
8,007,577 B2 *  8/2011    Gotoh .................. C09D 11/101
                                                        106/31.6
(Continued)

FOREIGN PATENT DOCUMENTS

EP    2143769 A1    1/2010
EP    2492321 A1    8/2012
(Continued)

OTHER PUBLICATIONS

Decision to Grant Japanese Patent Application No. 2016-041870, dated Jul. 25, 2016 with English translation (6 pages).
(Continued)

*Primary Examiner* — Huan Tran
*Assistant Examiner* — Alexander D Shenderov
(74) *Attorney, Agent, or Firm* — Hamre, Schumann, Mueller & Larson, P.C.

(57) ABSTRACT

An oil-based inkjet ink set including two or more liquid compositions, for use with an inkjet head having two or more discharge port arrays, wherein at least one of the two or more liquid compositions is an oil-based inkjet ink, the initial boiling point of each of the two or more liquid compositions is, independently, 280° C. or higher, and the difference in the specific gravities of any pair of liquid compositions in the two or more liquid compositions is at least 0.005 but not more than 0.012, is disclosed. A method for producing a printed item is also disclosed.

6 Claims, 3 Drawing Sheets

(58) Field of Classification Search
CPC ...... B41M 5/5218; C09D 11/36; C09D 11/40; C09D 11/30; C09D 11/38; C09D 11/322; C09D 11/328; C09D 11/101; C09D 11/005; C09D 11/54; C09D 11/52
USPC ....... 347/95–105, 9–22, 88; 106/31.6, 31.13, 106/31.27; 523/160, 161
See application file for complete search history.

(56) References Cited

U.S. PATENT DOCUMENTS

| | | | |
|---|---|---|---|
| 8,328,345 B2 | 12/2012 | Watanabe et al. | |
| 2004/0227799 A1* | 11/2004 | Ogawa | C09D 11/36 347/100 |
| 2004/0266907 A1* | 12/2004 | Sugita | C09D 11/36 523/160 |
| 2006/0139426 A1* | 6/2006 | Doi | C09D 11/40 347/100 |
| 2007/0200906 A1* | 8/2007 | Komatsu | B41J 11/0065 347/90 |
| 2008/0097013 A1* | 4/2008 | Mizutani | C09D 11/36 524/107 |
| 2008/0252708 A1 | 10/2008 | Hakamada et al. | |
| 2010/0033524 A1 | 2/2010 | Arai et al. | |
| 2012/0210908 A1 | 8/2012 | Endo et al. | |
| 2015/0267066 A1* | 9/2015 | Aoki | C09D 11/326 524/104 |

FOREIGN PATENT DOCUMENTS

| | | |
|---|---|---|
| JP | 2004-002666 | 1/2004 |
| JP | 2008001800 | 1/2008 |
| JP | 2008-024921 | 2/2008 |
| JP | 2010-058498 | 3/2010 |
| JP | 2010-270220 | 12/2010 |
| JP | 2011-012149 | 1/2011 |
| JP | 2011-089043 | 5/2011 |
| JP | 2012-011740 | 1/2012 |
| JP | 2012-025822 | 2/2012 |
| JP | 2013-000923 | 1/2013 |

OTHER PUBLICATIONS

Extended European Search Report, European Patent Application No. 17158330.5, Oct. 19, 2017 (4 pages).

\* cited by examiner

OIL-BASED INKJET INK SET AND METHOD FOR PRODUCING PRINTED ITEM

CROSS REFERENCE TO RELATED APPLICATIONS

This Application is based upon and claims the benefit of priority from prior Japanese Patent Applications No. 2016-041870 filed on Mar. 4, 2016, the entire contents of which are incorporated by reference herein.

BACKGROUND OF THE INVENTION

Field of the Invention

The present invention relates to an oil-based inkjet ink set and a method for producing a printed item.

Description of the Related Art

The inkjet recording method is a method in which an inkjet ink of high fluidity is jetted from fine nozzles in the form of liquid droplets, thus recording an image on a recording medium positioned facing the nozzles, and because this method enables high-speed printing to be conducted with minimal noise, it has rapidly become widespread in recent years. Examples of known types of inks that can be used in this type of inkjet recording method include aqueous inks which contain water as the main solvent, ultraviolet-curable inks (UV inks) which contain a large amount of a polymerizable monomer as the main component, hot melt inks (solid inks) which contain a large amount of a wax as the main component, and so-called non-aqueous inks which contain a non-aqueous solvent as the main solvent. Non-aqueous inks can be classified into solvent-based inks in which the main solvent is a volatile organic solvent, and oil-based inks in which the main solvent is an organic solvent having either low volatility or no volatility. Solvent-based inks mainly dry on the recording medium as a result of evaporation of the organic solvent, whereas oil-based inks mainly dry as a result of penetration into the recording medium.

With an oil-based ink, when a paper is used as the recording medium, because the effect on the bonds between the pulp fibers that constitute the structural component of the paper is small, the printed paper is unlikely to suffer from curling or cockling, and because penetration of the ink into the paper is rapid, the apparent drying properties are excellent. Moreover, oil-based inks also offer the advantages that because the solvent is difficult to volatilize, nozzle blockages are unlikely to occur, and the frequency of head cleaning can be reduced, making the inks applicable to high-speed printing.

On the other hand, with oil-based inks, because the coloring material in the ink penetrates into the paper, achieving a high print density is difficult, and because the ink typically does not contain a component for fixing the coloring material, if any of the coloring material remains on the surface of the recording medium, it tends to be prone to detachment or transfer.

Further, if printing is performed over a long period using an oil-based inkjet ink in an inkjet printer, then metal salts and the like included in the ink raw materials may sometimes be deposited as solids in the vicinity of the nozzles of the inkjet head, hindering normal discharge and causing image faults. In response to these types of problems, a method in which the amounts of specific metals in the ink are limited to amounts no greater than specified numerical values, and a method for producing an ink in which, without removing the problematic metal compounds, a specific pigment dispersant and/or organic solvent and a fixing resin are dispersed in an organic solvent containing a compound having a specific structure have been proposed (JP 2010-270220 A and JP 2011-089043 A).

SUMMARY OF THE INVENTION

According to an aspect of the present invention, an oil-based inkjet ink set is provided, the oil-based ink set comprising two or more liquid compositions, for use with an inkjet head having two or more discharge port arrays, wherein at least one of the two or more liquid compositions is an oil-based inkjet ink, an initial boiling point of each of the two or more liquid compositions is, independently, 280° C. or higher, and a difference in specific gravities of any pair of liquid compositions in the two or more liquid compositions is at least 0.005 but not more than 0.012.

According to another aspect of the present invention, a method for producing a printed item is provided, the method comprising discharging two or more liquid compositions from an inkjet head having two or more discharge port arrays onto a recording medium, wherein at least one of the two or more liquid compositions is an oil-based inkjet ink, an initial boiling point of each of the two or more liquid compositions is, independently, 280° C. or higher, and a difference in specific gravities of any pair of liquid compositions in the two or more liquid compositions is at least 0.005 but not more than 0.012.

DETAILED DESCRIPTION OF THE EMBODIMENTS

Figure 1:
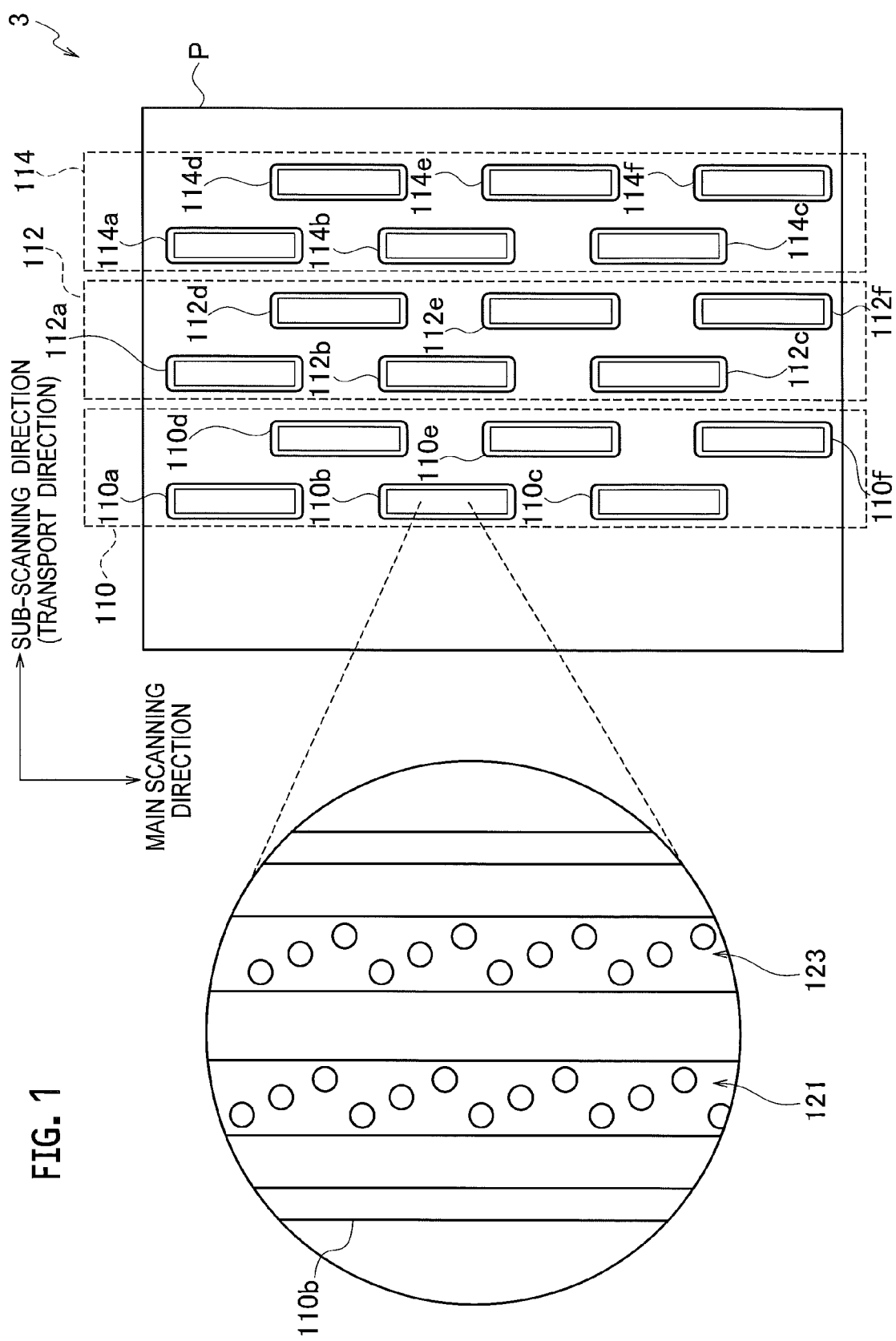
FIG. 1 is a schematic plan view of one example of an inkjet head unit provided with one example of inkjet heads having two or more discharge port arrays.

In the case of oil-based inks, when two different inkjet inks such as a black ink and a cyan ink are mixed, pigment aggregation can sometimes occur for reasons including a breakdown in the balance of the interactions between the pigments and the dispersants.

As a result, conventionally, printing systems that discharge ink of a single color from a single inkjet head have generally been used to avoid the mixing of different inks.

However, from the viewpoint of factors such as reducing the size of the printing apparatus, a system using oil-based inkjet inks that is capable of discharging two or more liquids (for example, two or more inks) from a single inkjet head is desirable.

Based on investigations of systems in which two or more liquids could be discharged from a single inkjet head, the inventors of the present invention discovered that when a series of cleaning operations were performed for the purposes of removing air bubbles in the ink paths and removing dirt from the nozzle plate in order to restore normal discharge, aggregates accumulated in the vicinity of the nozzles, causing discharge faults. Specifically, it was found that if, for example, two inks containing pigments were discharged from a single inkjet head, and a cleaning operation was subsequently performed by conducting a series of operations in which pressure is applied to the ink supply paths to fill the inside of the nozzles of the inkjet head with fresh ink and force the ink and any air bubbles or dirt mixed with the ink from the nozzles and onto the inkjet head surface (onto the nozzle plate), and then the accumulated deposits on the inkjet head surface are wiped away with a wiper or the like, the two inks were mixed on the nozzle plate and the pigments aggregated, which caused an accumulation of aggregates in the vicinity of the nozzles that in some cases caused discharge faults. It was also found that particularly in those cases where the printing apparatus was left idle for a long period, for example left to stand at room temperature for 3 months, even when a subsequent cleaning operation was performed, abnormal discharge problems tended to sometimes occur.

Further, these types of problems are not limited to those cases where two or more inks are used, and can also occur when an ink and another liquid besides the ink (such as a treatment liquid) are used. Further, the problems are not limited to inks that contain pigments, and can also occur when inks that contain dyes are used.

Further, when an image is formed using an inkjet system, generally, the precision of the impact position on the recording medium of the liquid droplets discharged from the discharge ports of the inkjet head influences the print quality of the image. Specifically, the liquid droplets discharged from the discharge ports generally fly in a form composed of a main droplet and a liquid tail that extends behind the liquid droplet, and of these components, the main droplet functions as the primary liquid droplet that forms the image on the recording medium, whereas the liquid tail separates from the main droplet during flight, and divides into a plurality of very fine liquid droplets (satellites). Impact of these satellites at locations different from the main droplet can cause satellite contamination (image blemishes caused by the satellites (very fine liquid droplets)), resulting in a deterioration in the image quality.

Accordingly, objects of embodiments of the present invention are to provide an oil-based inkjet ink set comprising two or more liquids including an oil-based inkjet ink, wherein even when the two or more liquids are discharged from an inkjet head having two or more discharge port arrays, the accumulation of aggregates on the head surface of the inkjet head can be reduced, enabling the inkjet head to exhibit favorable discharge stability even after standing idle for a long period, and enabling favorable image quality with reduced satellite contamination to be achieved, and also to provide a method for producing a printed item using this oil-based inkjet ink set.

One embodiment of the present invention relates to an oil-based inkjet ink set comprising two or more liquid compositions, wherein at least one of the two or more liquids is an oil-based inkjet ink, the initial boiling point of each of the two or more liquid compositions is, independently, 280° C. or higher, and the difference in the specific gravities of any pair of liquid compositions in the two or more liquid compositions is at least 0.005 but not more than 0.012. Further, another embodiment of the present invention relates to a method for producing a printed item using this type of oil-based inkjet ink set.

1. Oil-Based Inkjet Ink Set

The oil-based inkjet ink set of one embodiment of the present invention comprises two or more liquid compositions, wherein at least one of the two or more liquid compositions is an oil-based inkjet ink (hereafter also referred to as an "oil-based ink"), the initial boiling point of each of the two or more liquid compositions is, independently, 280° C. or higher, and the difference in the specific gravities of any pair of liquid compositions in the two or more liquid compositions is at least 0.005 but not more than 0.012.

When the inkjet ink set of this embodiment is used, the aforementioned accumulation of aggregates in the vicinity of the discharge ports as a result of cleaning operations can be reduced, even in those cases where two or more liquid compositions are discharged from a single inkjet head having two or more discharge port arrays. Accordingly, favorable discharge stability can be obtained even after the inkjet head has been left idle for a long period. Further, satellite contamination can be reduced, enabling a favorable image to be obtained.

There are no particular limitations on the two or more liquid compositions of the oil-based inkjet ink set, provided at least one of the liquid compositions is an oil-based inkjet ink. For example, in embodiments, the oil-based inkjet ink set may be an ink set composed of two or more oil-based inkjet inks, a set containing a combination of an oil-based inkjet ink and an oil-based liquid composition, or a set containing a combination of an oil-based inkjet ink and a treatment liquid. The treatment liquid included in the oil-based inkjet ink set is preferably an oil-based treatment liquid.

The expression "two or more liquid compositions" means two or more mutually different liquid compositions. Here "mutually different" includes not only those cases where the components included in the respective compositions are mutually different, but also those cases where, for example, the components are the same, but the amounts included of at least a portion of the components are different.

In embodiments, the oil-based inkjet ink set is an inkjet ink set for use with an inkjet head having two or more discharge port arrays.

One example of an inkjet head having two or more discharge port arrays is illustrated in FIG. 1. In FIG. 1, the inkjet heads have two discharge port arrays on a single nozzle plate surface.

FIG. 1 is described below in further detail. In FIG. 1, an inkjet head unit 3 has a plurality of aligned inkjet heads 110a to 110f, 112a to 112f and 114a to 114f, each of which has two discharge port arrays arranged across the transport direction of a recording medium ρ (namely, in a direction perpendicular to the main scanning direction). Each of the inkjet heads 110a to 110f has two discharge port arrays 121 and 123 on a single nozzle plate. Similarly, each of the inkjet heads 112a to 112f has two discharge port arrays on a single nozzle plate, and each of the inkjet heads 114a to 114f also has two discharge port arrays on a single nozzle plate.

In FIG. 1, each of the discharge port arrays 121 and 123 is composed of a plurality of rows in a zigzag arrangement. The two discharge port arrays in each of the inkjet heads 112a to 112f and 114a to 114f have similar structures to those of the discharge port arrays 121 and 123. In this manner, each of the discharge port arrays in each inkjet head may be composed of a plurality of rows arranged in a zigzag arrangement, although the invention is not limited to this particular configuration.

FIG. 1 describes one example of an inkjet head in embodiments. In embodiments, the inkjet head may be provided in the type of inkjet head unit illustrated in FIG. 1, but the invention is not limited to such a configuration.

By using an inkjet head having two or more discharge port arrays, a single inkjet head can be used to discharge two or more different liquids from the discharge port arrays.

On the other hand, when two or more liquids are discharged from the inkjet head having two or more discharge port arrays, if the two or more discharge port arrays on the nozzle plate are wiped with a single wiper during a cleaning operation, then the two or more liquids may be mixed on the nozzle plate and may form aggregates, and accumulation of these aggregates in the vicinity of the nozzles may cause discharge faults. When the inkjet ink set of the present embodiment is used, even when the two or more liquid compositions are discharged from a single inkjet head having two or more discharge port arrays, this accumulation of aggregates in the vicinity of the discharge ports as a result of cleaning operations can be reduced. As a result, favorable discharge stability can be obtained even after the inkjet head has been left idle for a long period.

In embodiments, the initial boiling points of the two or more liquid compositions included in the oil-based inkjet ink set are each, independently, preferably 280° C. or higher. If the initial boiling point of each of liquid compositions included in the oil-based inkjet ink set is 280° C. or higher, then because the liquid compositions are difficult to volatilize, even if the liquid compositions mix on the inkjet head surface and form aggregates, the adhered deposits on the inkjet head surface still exhibit some fluidity. As a result, wiping the aggregates off the inkjet head surface during cleaning operations is easier, which is thought to contribute to more favorable discharge stability after the inkjet head has been left idle for a long period.

The initial boiling point of the liquid composition is more preferably 290° C. or higher. For example, one or more, or all, of the liquid compositions included in the oil-based inkjet ink set preferably have an initial boiling point of 290° C. or higher. From the viewpoint of suppressing show-through, the initial boiling point of the liquid composition is preferably not more than 350° C., more preferably not more than 340° C., and even more preferably 320° C. or lower.

The initial boiling point of a liquid composition is the temperature at which the weight of the composition starts to decrease when the temperature of the liquid composition is raised from 23° C. to 500° C. at a rate of 15° C./minute in a thermogravimetric (TG) analyzer.

Specifically, the initial boiling point can be measured using a THERMO PLUS EVO2 differential thermal balance TG8121 (manufactured by Rigaku Corporation) as the thermogravimetric analyzer, and using an aluminum liquid sample pan and sample lid (Item No. 8580, manufactured by Rigaku Corporation) as the cell. The measurement sample can be prepared by opening a pin hole (measured diameter: ø150 to 160 μm) in the sample lid using a fine needle, placing about 10 mg of the sample in the sample pan, and then using a sample sealer (Item No. 8395D1, manufactured by Rigaku Corporation) to crimp and seal the sample.

In embodiments, the difference in the specific gravities of any pair of the two or more liquid compositions included in the oil-based inkjet ink set is at least 0.005 but not more than 0.012.

The expression that "the difference in the specific gravities of any pair of the two or more liquid compositions included in the oil-based inkjet ink set is at least 0.005 but not more than 0.012" means that among all of liquid compositions included in the oil-based inkjet ink set, the difference in the specific gravities of the liquid composition having the highest specific gravity and the liquid composition having the lowest specific gravity is at least 0.005 but not more than 0.012. For example, in the case where the oil-based inkjet ink set is composed of two liquid compositions A and B, the above expression means that the difference in the specific gravities of the liquid compositions A and B is at least 0.005 but not more than 0.012, whereas in the case where oil-based inkjet ink set is composed of three liquid compositions A, B and C, the above expression means that the difference in the specific gravities of the liquid compositions A and B, the difference in the specific gravities of the liquid compositions A and C, and the difference in the specific gravities of the liquid compositions B and C are all at least 0.005 but not more than 0.012.

When the difference in the specific gravities of any pair of liquid compositions is at least 0.005, the liquid compositions become more resistant to mixing. As a result, it is thought that, even when cleaning operations are performed, aggregate formation and accumulation on the inkjet head surface is suppressed, meaning wiping the aggregates off the inkjet head surface is easier, which contributes to more favorable discharge stability after the inkjet head has been left idle for a long period.

On the other hand, when the difference in the specific gravities of any pair of liquid compositions is not more than 0.012, because the difference in the discharge speeds of the liquid compositions when the two or more liquid compositions are discharged from the inkjet head is small, impact defects caused by satellites are reduced, satellite contamination decreases, and favorable image quality can be obtained more easily.

If the difference in the discharge speeds of the liquid compositions is particularly large, then the liquid having the higher discharge speed is prone to impact defects due to satellites, and is more likely to suffer from image defects caused by satellite contamination. On the other hand, even for the liquid having the slower discharge speed, a discharge speed that is too slow can cause a deterioration in the precision of the impact position, increasing the likelihood of image defects.

From the viewpoint of reducing satellite contamination, the difference in the specific gravities of any pair of liquid compositions is more preferably at least 0.005 but not more than 0.009.

In embodiment, in the oil-based inkjet ink set, the specific gravity of each liquid composition is, independently, preferably 0.890 or less. When the specific gravity of each liquid composition is 0.890 or less, impact defects due to satellites can be more easily reduced.

The specific gravity of a liquid composition is a value measured at 23° C., and can be measured, for example, using a portable density and specific gravity meter DA-130 (manufactured by Kyoto Electronics Manufacturing Co., Ltd.).

The specific gravity of the liquid composition is more preferably from 0.860 to 0.885. For example, one or more, or all, of the liquid compositions included in the oil-based inkjet ink set preferably have a specific gravity of 0.860 to 0.885.

In embodiment, the 80% distillation temperature of each of the two or more liquid compositions included in the oil-based inkjet ink set is, independently, from 300 to 350° C. When the 80% distillation temperature of each of the liquid compositions included in the oil-based inkjet ink set is from 300 to 350° C., the discharge stability following standing idle for a short period can be more easily improved, and show-through can be better suppressed.

The 80% distillation temperature of the liquid composition may, for example, be from 310 to 340° C. For example, one or more, or all, of the liquid compositions included in the oil-based inkjet ink set may have an 80% distillation temperature of 310 to 340° C.

The 80% distillation temperature of a liquid composition is the temperature at which the weight of the composition has decreased by 80%, relative to a value of 100% for the weight reduction that occurs when the temperature of the liquid composition is raised from 23° C. to 500° C. at a rate of 15° C./minute in a thermogravimetric (TG) analyzer. The thermogravimetric analyzer, the cell, and the sample preparation method are all as described above in relation to the method used for measuring the initial boiling point.

The initial boiling point and the 80% initial distillation temperature of each liquid composition can be adjusted by appropriate selection of the types, combination, and amounts and the like of the non-aqueous solvents included in the liquid composition.

From the viewpoint of easily ensuring that the initial boiling point of a liquid composition is 280° C. or higher, the boiling points or initial boiling points of all of the non-aqueous solvents contained in the liquid composition are preferably 280° C. or higher, and more preferably 290° C. or higher.

The scope of the non-aqueous solvents having a boiling point of 280° C. or higher also includes non-aqueous solvents that decompose at 280 to 500° C. without displaying an actual boiling point. The scope of the non-aqueous solvents having a boiling point of 290° C. or higher also includes non-aqueous solvents that decompose at 290 to 500° C. without displaying an actual boiling point.

From the viewpoint of ensuring that the 80% distillation temperature of a liquid composition is from 300 to 350° C., the liquid composition, for example, preferably contains at least one non-aqueous solvent having a boiling point or initial boiling point of 300 to 350° C. The scope of the non-aqueous solvents having a boiling point of 300 to 350° C. also includes non-aqueous solvents that decompose at 300 to 350° C. without displaying an actual boiling point. The liquid composition preferably contains at least 80% of non-aqueous solvents for which the final boiling point is 350° C. or lower.

The specific gravity of a liquid composition can be adjusted by, for example, appropriate selection of the types and amounts of the pigments included in the liquid composition, and the types, combination, and amounts and the like of the non-aqueous solvents included in the liquid composition. More specifically, the specific gravity can be adjusted by, for example, altering the ratio between polar organic solvents such as fatty acid ester-based solvents and non-polar organic solvents such as petroleum-based hydrocarbon solvents.

[Oil-Based Inkjet Ink]

In embodiments, at least one of the two or more liquid compositions of the oil-based inkjet ink set is an oil-based inkjet ink.

The oil-based inkjet ink generally contains a coloring material such as a pigment or dye, and a non-aqueous solvent. Components that may be included in the oil-based inkjet ink in embodiments are described below, but the following description does not limit the scope of the present invention. Further, components other than those described below may also be included in the oil-based inkjet ink.

<Coloring Material>

In embodiments, the oil-based inkjet ink may contain a pigment or a dye as the coloring material.

Examples of the dye include oil-soluble dyes such as azo dyes, metal complex salt dyes, naphthol dyes, anthraquinone dyes, indigo dyes, carbonium dyes, quinoneimine dyes, xanthene dyes, cyanine dyes, quinoline dyes, nitro dyes, nitroso dyes, benzoquinone dyes, naphthoquinone dyes, phthalocyanine dyes and metal phthalocyanine dyes.

These dyes may be used individually, or a combination of two or more dyes may be used.

Examples of the pigment include organic pigments such as azo pigments, phthalocyanine pigments, polycyclic pigments and dye lake pigments, and inorganic pigments.

Examples of the azo pigments include soluble azo lake pigments, insoluble azo pigments and condensed azo pigments. Examples of the phthalocyanine pigments include metal phthalocyanine pigments and metal-free phthalocyanine pigments. Examples of the polycyclic pigments include quinacridone-based pigments, perylene-based pigments, perinone-based pigments, isoindoline-based pigments, isoindolinone-based pigments, dioxazine-based pigments, thioindigo-based pigments, anthraquinone-based pigments, quinophthalone-based pigments, metal complex pigments and diketopyrrolopyrrole (DPP).

Representative examples of the inorganic pigments include carbon black and titanium oxide.

These pigments may be used individually, or a combination of two or more pigments may be used.

<Pigment Dispersant>

In embodiments, in those cases where the oil-based inkjet ink contains a pigment, a pigment dispersant is preferably included in order to improve dispersion of the pigment in the oil-based ink.

There are no particular limitations on the pigment dispersant, provided the pigment is able to be dispersed stably in the non-aqueous solvent, and examples of pigment dispersants that can be used favorably include hydroxyl group-containing carboxylate esters, salts of long-chain polyaminoamides and high-molecular weight acid esters, salts of high-molecular weight polycarboxylic acids, salts of long-chain polyaminoamides and polar acid esters, high-molecular weight unsaturated acid esters, copolymers of vinylpyrrolidone and long-chain alkenes, modified polyurethanes, modified polyacrylates, polyether ester anionic surfactants, polyoxyethylene alkyl phosphate esters, and polyester polyamines.

Examples of commercially available pigment dispersants include ANTARON V216 (a vinylpyrrolidone-hexadecene copolymer) (a product name), manufactured by ISP Japan Ltd., SOLSPERSE 13940 (a polyester amine-based dispersant), SOLSPERSE 17000 and SOLSPERSE18000 (fatty acid amine-based dispersants), and SOLSPERSE11200, SOLSPERSE 24000 and SOLSPERSE 28000 (all product names), manufactured by The Lubrizol Corporation, EFKA 400, EFKA 401, EFKA 402, EFKA 403, EFKA 450, EFKA 451 and EFKA 453 (modified polyacrylates) and EFKA 46, EFKA 47, EFKA 48, EFKA 49, EFKA 4010 and EFKA 4055 (modified polyurethanes) (all product names), manufactured by BASF Japan Ltd., DISPARLON KS-860 and DISPARLON KS-873N4 (polyester amine salts) (both product names), manufactured by Kusumoto Chemicals, Ltd., and DISCOL 202, DISCOL 206, DISCOL OA-202 and DISCOL OA-600 (multi-chain polymeric nonionic dispersants) (all product names), manufactured by Dai-ichi Kogyo Seiyaku Co., Ltd.

The pigment dispersant is preferably included in the oil-based inkjet ink in a mass ratio of 0.2 to 1.0 relative to the pigment. The amount of the pigment dispersant in the total mass of the ink is preferably from 0.5 to 15% by mass, and more preferably from 1 to 5% by mass.

<Pigmentary Synergist Agent>

In embodiments, in those cases where the oil-based inkjet ink contains a pigment, a pigmentary synergist agent (also referred to as a "synergist") may also be included to improve dispersion of the pigment in the oil-based inkjet ink.

The pigmentary synergist agent may be any compound having a polar functional group introduced into a pigment skeleton.

Examples of preferred pigmentary synergist agents include compounds in which a functional group such as a carboxyl group, sulfo group, amino group, nitro group, acid amide group, carbonyl group, carbamoyl group, phthalimide group or sulfonyl group has been added to a pigment skeleton such as a phthalocyanine-based skeleton, azo-based skeleton, anthraquinone-based skeleton or quinacridone-based skeleton, as well as salts of these compounds. Specific examples include basic phthalocyanine pigmentary synergist agents in which an alkylaminomethyl group or the like has been introduced into copper phthalocyanine blue, acidic phthalocyanine pigmentary synergist agents in which a sulfonic acid group, or metal salt or alkyl amine salt thereof has been introduced, neutral copper phthalocyanine pigmentary synergist agents in which a phthalimide group or the like has been introduced, asymmetrical disazo yellow pigmentary synergist agents in which a functional group has been introduced into only one of the two terminal benzene rings, and Schiff base disazo yellow pigmentary synergist agents that have been reacted with an aliphatic amine. Further, with respect to condensed polycyclic pigmentary synergist agents such as quinacridone pigmentary synergist agents and anthraquinone pigmentary synergist agents, those in which a functional group that is similar to that of the phthalocyanine pigmentary synergist agents has been introduced may be used favorably. These pigmentary synergist agents may be used individually, or a combination of two or more pigmentary synergist agents may be used.

Examples of commercially available pigmentary synergist agents that can be used favorably include SOLSPERSE 5000 (a phthalocyanine pigmentary synergist agent), SOLSPERSE 12000 (a phthalocyanine pigmentary synergist agent) and SOLSPERSE 22000, manufactured by The Lubrizol Corporation, BYK-SYNERGIST 2100 (a phthalocyanine pigmentary synergist agent) and BYK-SYNERGIST 2105 (a yellow pigmentary synergist agent), manufactured by BYK Chemie Japan K.K., and EFKA 6745 (a phthalocyanine pigmentary synergist agent) and EFKA 6750 (an azo pigmentary synergist agent), manufactured by BASF Japan Ltd.

A pigmentary synergist agent having the same or a similar skeleton to the pigment used can be used particularly favorably. For example, if carbon black or copper phthalocyanine blue is used as the pigment, then a phthalocyanine pigmentary synergist agent can be used favorably as the pigmentary synergist agent.

<Non-Aqueous Solvent>

In embodiment, in the oil-based inkjet ink, both non-polar organic solvents and polar organic solvents may be sued as the non-aqueous solvent. One of these solvents may be used singly or two or more thereof may be used in combination.

In the present invention, a water-insoluble organic solvent that does not mix uniformly with an equal volume of water at 1 atmosphere and 20° C. is preferably used as the non-aqueous solvent.

Examples of preferred non-polar organic solvents include petroleum-based hydrocarbon solvents such as aliphatic hydrocarbon solvents, alicyclic hydrocarbon solvents and aromatic hydrocarbon solvents.

Examples of the aliphatic hydrocarbon solvents and alicyclic hydrocarbon solvents include paraffin-based non-aqueous solvents, isoparaffin-based non-aqueous solvents, and naphthene-based non-aqueous solvents. Examples of commercially available products that can be used favorably include 70-S, 80-S, 90-S, 100-S, 120-S, 150-S, 260-S, 350-S and No. 350 (all product names, manufactured by Sanko Chemical Industry Co., Ltd.), and AF SOLVENT No. 5 and AF SOLVENT No. 6, (both product names, manufactured by JX Nippon Oil & Energy Corporation).

Examples of aromatic hydrocarbon solvents that can be used favorably include GRADE ALKENE L and GRADE ALKENE 200P (both product names, manufactured by JX Nippon Oil & Energy Corporation).

The initial boiling point of the petroleum-based hydrocarbon solvent is preferably 280° C. or higher, and more preferably 290° C. or higher. The initial boiling point can be measured in accordance with JIS K0066 "Test Methods for Distillation of Chemical Products".

Examples of preferred polar organic solvents include fatty acid ester-based solvents, dibasic acid ester-based solvents, higher alcohol-based solvents and higher fatty acid-based solvents. Specific examples include fatty acid ester-based solvents having a carbon number of at least 13, and preferably a carbon number of 16 to 30, in a single molecule, such as isononyl isononanoate, isodecyl isononanoate, methyl laurate, isopropyl laurate, hexyl laurate, isopropyl myristate, isopropyl palmitate, hexyl palmitate, isooctyl palmitate, isostearyl palmitate, methyl oleate, ethyl oleate, isopropyl oleate, butyl oleate, hexyl oleate, methyl linoleate, ethyl linoleate, isobutyl linoleate, butyl stearate, hexyl stearate, isooctyl stearate, isopropyl isostearate, 2-octyldecyl pivalate, methyl soybean oil, isobutyl soybean oil, methyl tallate and isobutyl tallate; dibasic acid ester-based solvents having a carbon number of at least 10, and preferably a carbon number of 14 to 30, in a single molecule, such as dibutyl phthalate, dioctyl adipate and diisodecyl phthalate; higher alcohol-based solvents having a carbon number of at least 6, and preferably a carbon number of 12 to 20, in a single molecule, such as isomyristyl alcohol, isopalmityl alcohol (isohexadecanol), isostearyl alcohol, oleyl alcohol, isoeicosyl alcohol (isoeicosanol) and decyltetradecanol; and higher fatty acid-based solvents having a carbon number of at least 12, and preferably a carbon number of 14 to 20, in a single molecule, such as lauric acid, isomyristic acid, palmitic acid, isopalmitic acid, α-linolenic acid, linoleic acid, oleic acid and isostearic acid.

The boiling point of these polar organic solvents such as the fatty acid ester-based solvents, dibasic acid ester-based solvents, higher alcohol-based solvents and higher fatty acid-based solvents is preferably 280° C. or higher, and more preferably 290° C. or higher.

The scope of the non-aqueous solvents having a boiling point of 280° C. or higher also includes non-aqueous solvents that decompose at 280° C. or higher without displaying an actual boiling point. Further, the scope of the non-aqueous solvents having a boiling point of 290° C. or higher also includes non-aqueous solvents that decompose at 290° C. or higher without displaying an actual boiling point.

These non-aqueous solvents may be used individually, or a combination of two or more solvents may be used, provided they form a single phase.

Further, an organic solvent other than a water-insoluble organic solvent, for example a glycol ether-based solvent having a carbon number of at least 12 in a single molecule such as tetraethylene glycol monobutyl ether, may be added to the oil-based inkjet ink in combination with a water-insoluble organic solvent, provided this other organic solvent is able to form a single phase with the water-insoluble organic solvent. The boiling point of the organic solvent other than the water-insoluble organic solvent is preferably 280° C. or higher, and more preferably 290° C. or higher.

The scope of the organic solvents other than the water-insoluble organic solvent and having a boiling point of 280° C. or higher include solvents that decompose at 280° C. or higher without displaying an actual boiling point. The scope of the organic solvents other than the water-insoluble organic solvent and having a boiling point of 290° C. or higher include solvents that decompose at 290° C. or higher without displaying an actual boiling point In those cases where this type of organic solvent other than the water-insoluble organic solvent is used, the amount of this other organic solvent in the ink is preferably not more than 50% by mass, more preferably not more than 35% by mass, and even more preferably 10% by mass or less.

In embodiments, the ideal range for the viscosity of the oil-based inkjet ink varies depending on the diameter of the discharge nozzles of the inkjet head and the discharge environment and the like, but generally, the viscosity is preferably in a range from 1 to 30 mPa·s at 23° C., and is more preferably from 5 to 15 mPa·s.

[Treatment Liquid]

In embodiments, at least one of the two or more liquid compositions of the oil-based inkjet ink set may be a treatment liquid.

In embodiments, a treatment liquid is an oil-based liquid used for improving various performance factors such as increasing the print density, suppressing show-through, improving the abrasion resistance and weather resistance, and imparting or reducing the level of gloss. The treatment liquid may be an oil-based treatment liquid containing a treatment agent and a non-aqueous solvent, or an oil-based treatment liquid that itself acts as the treatment liquid.

The treatment liquid may be a so-called pretreatment liquid or a post-treatment liquid. In other words, the treatment liquid may be discharged prior to discharge of the oil-based ink, namely from a discharge port array positioned upstream in the print medium transport direction from the discharge port array for the oil-based ink, or may be discharged from a discharge port array positioned after the discharge port array for the oil-based ink.

The treatment liquid may be used for the purpose of improving the image formed by an ink discharged from another discharge port array in the same inkjet head. Alternatively, the treatment liquid may be used as a treatment liquid for the image of an ink discharged from a different inkjet head from the inkjet head that discharges the treatment liquid. Further, treatment liquids may also be used for both of these purposes.

In those cases where a plurality of treatment liquids are provided, and an effect is achieved by combining the plurality of treatment liquids, the plurality of treatment liquids may be discharged from separate discharge ports in the same inkjet head, or may be discharged from separate inkjet heads.

For example, in the case where the ink and the treatment liquid are discharged from the inkjet heads 110a to 110f illustrated in FIG. 1, when the treatment liquid is a pretreatment liquid, the treatment liquid may be discharged from the upstream discharge port array 121, whereas when the treatment liquid is a post-treatment liquid, the treatment liquid may be discharged from the downstream discharge port array 123.

The treatment liquid preferably contains a treatment agent. The treatment agent may be any agent having a function that improves any of various performance factors via a physical or chemical effect. Examples of the treatment agent include α,β-unsaturated carbonyl compounds, primary amine compounds, secondary amine compounds, compounds containing a reactive functional group, compounds containing a polyvalent metal ion, polymeric compounds containing an anionic functional group, polymeric compounds containing a cationic functional group, solid resin particles, extender pigments and crosslinking agents.

Examples of the α,β-unsaturated carbonyl compounds include (meth)acrylate diesters of aliphatic or alicyclic dihydric alcohols having a carbon number of 4 to 12, such as 1,6-hexanediol diacrylate, 1,9-nonanediol diacrylate and 1,10-decanediol diacrylate; (meth)acrylate diesters having an alkylene oxide group, such as ethoxylated bisphenol A diacrylate, propoxylated ethoxylated bisphenol A diacrylate and polypropylene glycol diacrylate; (meth)acrylate triesters such as ethoxylated glycerol triacrylate and pentaerythritol triacrylate; and (meth)acrylate tetraesters such as ditrimethylolpropane tetraacrylate. α,β-unsaturated carbonyl compounds may be used in post-treatment liquids, and may be used in pretreatment liquids.

Although dependent on the type of ink (the components contained in the ink), α,β-unsaturated carbonyl compounds may act to increase the viscosity of the ink on the print medium, thereby fixing the coloring material on the surface of the print medium, and can therefore be used to increase the print density.

Examples of the primary or secondary amine compounds include diamines such as ethylenediamine, hexamethylenediamine, fluorenediamine, beef tallow propylenediamine and polyoxypropylenediamine; and polymeric amines having a plurality of primary amines or secondary amines in a single molecule, such as polyallylamine, polyvinylamine, polyalkyleneamine, polyvinylpyridine, polydiallylamine, polyamidopolyamine, polyamidine and poly(acrylic acid hydrazide). Primary or secondary amine compounds may be used in pretreatment liquids, and may be used in post-treatment liquids.

Although dependent on the type of ink (the components contained in the ink), when any of the primary or secondary amine compounds mixes and reacts with the ink on the print medium, a cross-linked structure may be formed that lead to gelling, and because this may promote aggregation of the coloring material and fixing of the coloring material on the surface of the print medium, the primary or secondary amine compounds can be used to increase the print density.

Examples of the compounds containing a reactive functional group include amino group-containing compounds such as polyamides having an active hydrogen equivalent weight of 50 to 300, ethylenediamine, trimethylenediamine, hexamethylenediamine, diethylenetriamine, triethylenetetramine, tetraethylenepentamine, diethylaminopropylamine, polyamidopolyamine and menthanediamine; isocyanate group-containing compounds such as tolylene diisocyanate, 1,4-diphenylmethane diisocyanate, 1,5-naphthalene diisocyanate, triphenylmethane triisocyanate, tolidine diisocyanate, xylene diisocyanate, dicyclohexylmethane diisocyanate and hexamethylene diisocyanate; aldehyde group-containing compounds such as dodecyl aldehyde, nonyl aldehyde and heptyl aldehyde; vinyl group-containing compounds such as divinylbenzene and N-vinylformamide; and (meth)acryloyl group-containing compounds such as 1,6-hexanediol (meth)acrylate and 1,9-nonanediol (meth)acrylate. Compounds containing a reactive functional group are preferably used in pretreatment liquids.

Although dependent on the type of ink (the components contained in the ink), these compounds containing a reactive functional group may act by causing the ink droplets to aggregate on the print medium, thereby suppressing penetration of the ink into the print medium, and can therefore be used to suppress show-through and increase the print density.

Examples of the compounds containing a polyvalent metal ion include metal soaps and chelate compounds of metals such as Al, Zn and Zr. Compounds containing a polyvalent metal ion are preferably used in pretreatment liquids.

Although dependent on the type of ink (the components contained in the ink), compounds containing a polyvalent metal ion may form a chelate bond, namely a chelate ring, with the ink components on the print medium, leading to gelling, and because this has the effects of suppressing penetration into the print medium and promoting fixing on the print medium, these compounds can be used to suppress show-through, increase the print density, and ensure superior abrasion resistance.

Examples of the polymeric compounds containing an anionic functional group include polymeric compounds obtained using a constituent monomer having an anionic functional group described below as one of the constituent monomers. In other words, examples include polymeric compounds containing, as one of the constituent monomers, a monomer having a carboxyl group such as acrylic acid or methacrylic acid; a monomer having a sulfo group such as styrenesulfonic acid, vinylsulfonic acid and 2-acrylamido-2-methylpropanesulconic acid; a monomer having a phosphate group such as mono(2-methacryloyloxyethyl) acid phosphate, di(2-methacryloyloxyethyl) acid phosphate, mono(2-acryloyloxyethyl) acid phosphate and di(2-acryloyloxyethyl) acid phosphate; a monomer having a nitrate group; or a monomer having a carbonate group. Polymeric compounds containing an anionic functional group may be used in post-treatment liquids, and may be used in pretreatment liquids.

Although dependent on the type of ink (the components contained in the ink), these polymeric compounds containing an anionic functional group may react with the ink components on the print medium causing gelling, which may have the effect of suppressing penetration of the coloring material into the print medium, and can therefore be used to prevent show-through and any deterioration in the print density.

Examples of the polymeric compounds containing a cationic functional group include polymers obtained using a constituent monomer having a cationic functional group described below as one of the constituent monomers. In other words, examples include polymeric compounds containing, as one of the constituent monomers, an amino group-containing silane (aminosilane) such as N-2-(aminoethyl)-3-aminopropyltriethoxysilane, N-2-(aminoethyl)-3-aminopropylmethyldimethoxysilane or N-2-(aminoethyl)-3-aminopropyltrimethoxysilane. Polymeric compounds containing a cationic functional group may be used in post-treatment liquids, and may be used in pretreatment liquids.

Although dependent on the type of ink (the components contained in the ink), these polymeric compounds containing a cationic functional group may react with the ink components on the print medium causing gelling, which may have the effect of suppressing penetration of the coloring material into the print medium, and can therefore be used to prevent show-through and any deterioration in the print density.

Examples of the solid resin particles include alkylphenol resins, polyamide resins, polyvinyl alcohol, cellulose-based resins such as nitrocellulose, polyvinyl acetal resins such as butyral resin, (meth)acrylic-based resins, styrene/(meth) acrylic-based resins, styrene/maleic acid resins and esters thereof, phosphate ester resins such as phosphorylated polyvinyl alcohol and phosphorylated polyvinyl acetal, and nitrate ester resins such as nitrocellulose, acetyl nitrocellulose, and carboxymethyl cellulose nitrate ester.

Although dependent on the type of ink (the components contained in the ink), these solid resin particles may have the effect of forming a coating film on the printed item, and can therefore be used to enhance the abrasion resistance of the printed item. These solid resin particles are preferably used in post-treatment liquids.

Examples of the extender pigments include talc, diatomaceous earth, calcium carbonate, barium carbonate, barium sulfate, alumina white, silica, kaolin, mica, acid clay, activated clay and bentonite.

Although dependent on the type of ink (the components contained in the ink), these extender pigments may have the effect of filling pores in the surface of the print medium, thereby suppressing penetration of the coloring material, and can therefore be used to increase the print density, reduce show-through, and suppress bleeding. Extender pigments may be used in pretreatment liquids, and may be used in post-treatment liquids.

Examples of the crosslinking agents include carbodiimide-based compounds, aziridine-based compounds, metal chelate-based compounds, isocyanate-based compounds, melamine-based compounds, epoxy-based compounds, oxazoline-based compounds, urea-based compounds, polyamine-based compounds, polyethyleneimine-based compounds and acrylamide-based compounds.

Although dependent on the type of ink (the components contained in the ink), these crosslinking agents may have the effect of forming a coating film on the print medium, and can therefore be used to enhance the abrasion resistance and weather resistance of the printed item. These crosslinking agents may be used in pretreatment liquids, and may be used in post-treatment liquids.

Examples of other components that may be included in the treatment liquid include those components, other than the coloring material, described above as components that can be used in the oil-based inkjet ink, such as non-aqueous solvents and the like, and the preferred amounts and specific examples of these other components may be the same as those mentioned above for the components that can be used in the oil-based inkjet ink. Further, the preferred range for the viscosity of the treatment liquid is the same as the range disclosed above for the viscosity of the oil-based inkjet ink.

2. Method for Producing Printed Item

The method for producing a printed item according to an embodiment of the present invention includes discharging two or more liquid compositions from an inkjet head having two or more discharge port arrays onto a recording medium, wherein at least one of the two or more liquid compositions is an oil-based inkjet ink, the initial boiling point of each of the two or more liquid compositions is, independently, 280° C. or higher, and the difference in the specific gravities of any pair of liquid compositions in the two or more liquid compositions is at least 0.005 but not more than 0.012.

When the method for producing a printed item according to this embodiment is used, the aforementioned accumulation of aggregates in the vicinity of the discharge ports as a result of cleaning operations can be reduced, even in those cases where two or more liquid compositions are discharged from a single inkjet head having two or more discharge port arrays. Accordingly, favorable discharge stability can be obtained even after the inkjet head has been left idle for a long period.

<Oil-Based Inkjet Ink Set>

In embodiments, in the method for producing a printed item, the oil-based inkjet ink set described above may be used as the oil-based inkjet ink set.

<Recording Medium>

In embodiments, there are no particular limitations on the recording medium, and examples of media that can be used include printing papers such as plain papers, coated papers and specialty papers, fabrics, inorganic sheets, films and OHP sheets, and adhesive sheets or the like having one of these media as a substrate, with an adhesive layer provided on the back surface of the substrate. Among these, from the viewpoint of the ink penetration, a printing paper such as a plain paper or coated paper can be used particularly favorably.

Here, plain paper describes a normal paper in which an ink receiving layer or film layer or the like has not been formed on the surface of the paper. Examples of plain papers include high-quality papers, medium-quality papers, PPC papers, woody papers and recycled papers. In a plain paper, a spacing between fibers of several tens to several hundred μm is formed with paper fibers with a thickness of several μm to several tens of μm, and therefore the ink can penetrate readily.

Further, in terms of coated papers, coated papers designed for inkjets such as matt papers, gloss papers and semi-gloss papers, and other so-called coated printing papers can be used favorably. A coated printing paper describes the type of printing paper that has conventionally been used in relief printing, offset printing, and gravure printing and the like, and is a printing paper in which a coating layer is formed on the surface of a high-quality paper or medium-quality paper using a coating material containing an inorganic pigment such as clay or calcium carbonate and a binder such as starch. Depending on the amount applied of the coating material and the coating method used, coated printing papers are classified into fine coated papers, high-quality lightweight coated papers, medium-quality lightweight coated papers, high-quality coated papers, medium-quality coated papers, art papers, and cast coated papers and the like. Coated printing papers have reduced gaps on the paper surface compared with plain papers and coated papers designed for inkjets, and therefore penetration of the ink is slow, and the ink components are more readily retained on the surface of the paper.

<Inkjet Head>

The inkjet head having two or more discharge port arrays used in the method for producing a printed item in embodiments is as described above in the description relating to the oil-based inkjet ink set. For example, the inkjet head illustrated in FIG. 1 may be used, but the inkjet head is not limited to such a configuration.

<Inkjet Printing Apparatus>

One example of an inkjet printing apparatus that can be used in the method for producing a printed item in embodiments is described below using the drawings. However, the present invention is not limited to this particular apparatus.

Figure 2:
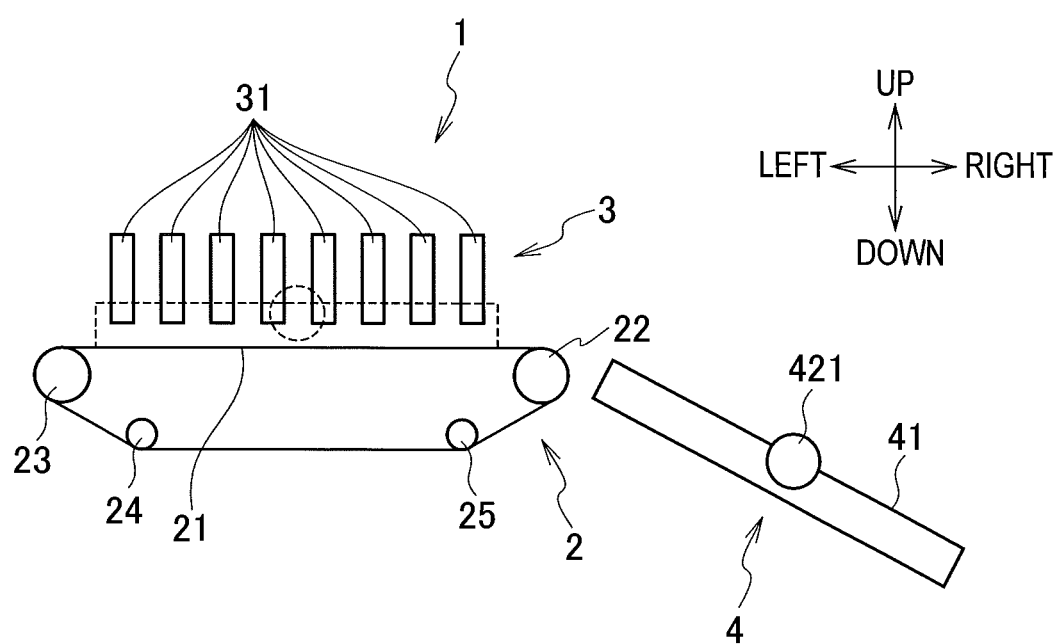
FIG. 2 is a schematic view of one example of an inkjet printing apparatus.
Figure 3:
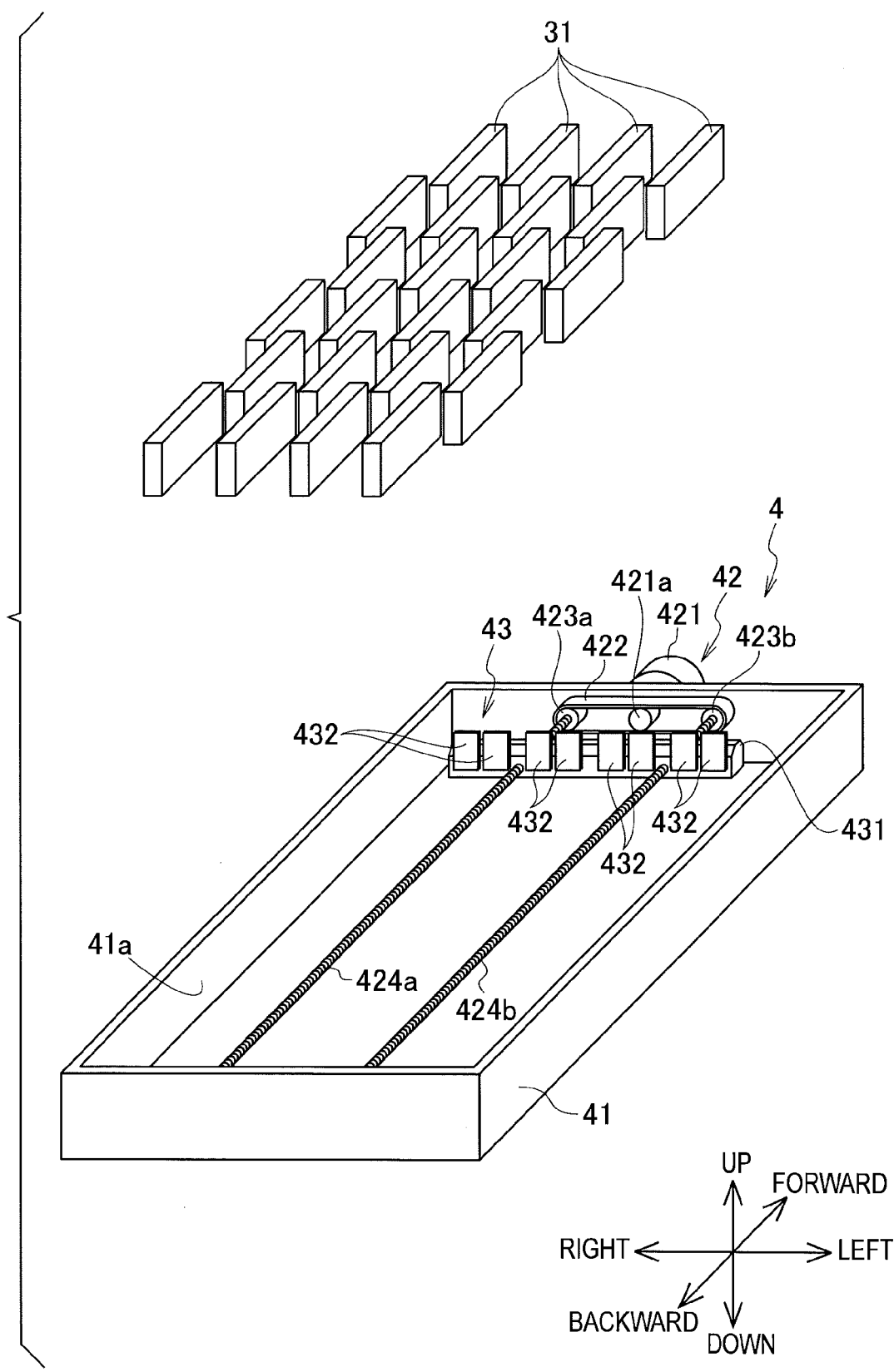
FIG. 3 is an exploded perspective view of one example of a maintenance unit.

FIG. 2 is a schematic view of one example of an inkjet printing apparatus that can be used in the method for producing a printed item in embodiments. FIG. 3 is an exploded perspective view of one example of a maintenance unit.

The inkjet printing apparatus 1 illustrated in FIG. 2 has a transport section 2, an inkjet head unit 3 and a maintenance unit 4.

The transport section 2 has a conveyor belt 21 provided facing the inkjet head unit 3, a drive roller 22 that rotationally drives the conveyor belt 21, and driven rollers 23, 24 and 25 which are driven by the drive roller 22.

The conveyor belt 21 is stretched around the drive roller 22 and the driven rollers 23, 24 and 25, and during printing, the driving force of the drive roller 22 causes the conveyor belt 21 to rotate endlessly, thereby supporting and transporting paper supplied from a paper supply unit provided at the left of the apparatus but not shown in the drawing.

The transport section 2 is configured to be able to move between a printing position, which is the position used during printing, and a retracted position located beneath the printing position. Movement of the transport section 2 to the retracted position is used when cleaning (maintenance) of the inkjet head unit 3 is performed, and is conducted so as to allow the maintenance unit 4 to be moved between the transport section 2 and the inkjet head unit 3.

The inkjet head unit 3 has line-type inkjet heads 31, and discharges ink onto the paper transported by the conveyor belt 21, thereby printing an image. The inkjet heads 31 are inkjet heads having two or more discharge port arrays, and are aligned above the transport section 2 along the left-right direction with a prescribed space therebetween.

The maintenance unit 4 is used for cleaning the surface of the nozzle plate at which the discharge ports are formed, of each of the inkjet heads 31. During printing, the maintenance unit 4 is located at a standby position shown by the solid lines in FIG. 2. The standby position is positioned to the lower right of the transport section 2. When maintenance is performed, the maintenance unit 4 is moved to a maintenance position shown by the dashed lines in FIG. 2. The maintenance position is located between the transport section 2 and the inkjet heads 31.

As illustrated in FIG. 3, the maintenance unit 4 includes an ink-receiving member 41, a drive section 42, a wiper unit 43, and a drive motor and vertical motor that are not shown in the drawing. FIG. 3 illustrates the state when the maintenance unit 4 is located at the maintenance position.

The ink-receiving member 41 receives ink and the like that is removed by cleaning. The ink-receiving member 41 also holds each of the other members of the maintenance unit 4. The ink-receiving member 41 is formed in the shape of a rectangular solid. A recessed portion 41a for collecting the ink and the like is formed in the center of the ink-receiving member 41. The recessed portion 41a is formed to have a size which, when viewed in plan view, is larger than the region in which the inkjet heads 31 are disposed. The top surface of the ink-receiving member 41 is open.

The drive section 42 is used for moving the wiper unit 43 forwards and backwards during maintenance. The drive section 42 has a wiper drive motor 421, a drive belt 422, a pair of drive pulleys 423a and 423b, and a pair of crossed helical gears 424a and 424b. The wiper drive motor 421 has an output gear 421a.

The wiper unit 43 wipes the inkjet head surface (nozzle plate) of each of the inkjet heads 31 during maintenance, thereby removing ink and the like adhered to the inkjet head surface, and is provided with a mount 431 and eight wipers 432.

The mount 431 is the component to which the wipers 432 are attached, and is composed of a long, thin prism-shaped member that extends across the forward-backward direction. A pair of screw holes 431a and 431b are formed in the mount 431. The crossed helical gears 424a and 424b pass through and engage with these screw holes 431a and 431b respectively. Accordingly, by rotating the crossed helical gears 424a and 424b, the mount 431 can be moved in the forward and backward directions.

The wipers 432 remove ink and the like by sliding across the nozzle plates (inkjet head surfaces) of the inkjet heads 31. The wipers 432 are formed from a material such as an elastically deformable rubber or the like. The material used for forming the wipers 432 is preferably a material having sufficient elasticity that it does not damage the nozzle surfaces. The wipers 432 are formed in the shape of thin rectangular plates.

When in the maintenance position, the top edges of the wipers 432 are positioned higher than the nozzle plates of the inkjet heads 31. As a result, when the wipers 432 are moved in the forward and backward directions and contact the inkjet heads 31, the wipers 432 undergo elastic deformation and slide across the nozzle plates.

In a cleaning operation, for example, the paths for supplying the liquid compositions such as ink to the inkjet heads 31 are pressurized to force the liquid compositions from the discharge ports of the inkjet heads (so-called purging). Subsequently, the wiper drive motor 421 is activated to move the wipers 432 and wipe the inkjet heads 31.

When the wiper drive motor 421 is activated, the rotational driving force of the wiper drive motor 421 is transmitted to the output gear 421a, the drive belt 422 and the drive pulleys 423a and 423b, thereby rotating the crossed helical gears 424a and 424b. As a result, the wipers 432 move in the backward direction together with the mount 431 that is engaged with the crossed helical gears 424a and 424b. The upper portions of the wipers 432 are moved to the point of contact with the inkjet heads, and the wipers 432 are then forced against the inkjet heads 31 and undergo elastic deformation. By continuing to move the wipers 432 backward in this state, the back side of the wipers 432 slides across the nozzle plates of the inkjet heads.

By performing wiping in this manner, liquid compositions such as ink and other dirt adhered to the nozzle plates are removed.

When the oil-based inkjet ink set of the above-described embodiment is used, even if two or more liquid compositions are discharged from a single inkjet head, and these two or more liquids are mixed on the nozzle plate of the inkjet head in the vicinity of the discharge ports during cleaning operations, the accumulation of aggregates in the vicinity of the discharge ports of the inkjet head can be suppressed. As a result, favorable discharge stability can be obtained even after the inkjet head has been left idle for a long period.

EXAMPLES

The present invention is described below in further detail using a series of examples, but the present invention is in no way limited by these examples.

[Preparation of Oil-Based Inkjet Inks and Oil-Based Treatment Liquids and Measurement of Physical Properties]

The components shown in Tables 1 to 6 were mixed, and the resulting mixtures were each dispersed for 60 minutes using a beads mill (DYNO-MILL MUTILAB, manufactured by Shinmaru Enterprises Corporation, using zirconia beads with a diameter of 0.5 mm). Subsequently, the thus obtained mixtures were filtered through a membrane filter with a pore size of 5 μm, yielding oil-based inkjet inks K1 to K17, C1 to C12, M1 and Y1, and an oil-based treatment liquid 1.

The oil-based inkjet inks K1 to K17, C1 to C12, M1 and Y1, and the oil-based treatment liquid 1 are listed in Tables 1 to 6 as inks K1 to K17, C1 to C12, M1 and Y1, and treatment liquid 1 respectively.

For each of the oil-based inkjet inks, physical property values (specific gravity, initial boiling point, and 80% distillation temperature) were measured using the methods described below. The results are shown in Tables 1 to 6.

<Specific Gravity>

The specific gravity of each oil-based inkjet ink was measured at 23° C. using a portable density and specific gravity meter DA-130 (manufactured by Kyoto Electronics Manufacturing Co., Ltd.).

<Initial Boiling Point>

The initial boiling point of each oil-based inkjet ink was recorded as the temperature at which the weight of the ink started to decrease when the temperature of the oil-based inkjet ink was raised from 23° C. to 500° C. at a rate of 15° C./minute in a thermogravimetric (TG) analyzer.

A THERMO PLUS EVO2 differential thermal balance TG8121 (manufactured by Rigaku Corporation) was used as the thermogravimetric analyzer, and an aluminum liquid sample pan and sample lid (Item No. 8580, manufactured by Rigaku Corporation) were used as the cell. The measurement sample was prepared by opening a pin hole (measured diameter: ø150 to 160 μm) in the sample lid using a fine needle, placing about 10 mg of the sample in the sample pan, and then using a sample sealer (Item No. 8395D1, manufactured by Rigaku Corporation) to crimp and seal the sample.

<80% Distillation Temperature>

The 80% distillation temperature of each oil-based inkjet ink was recorded as the temperature at which the weight of the liquid composition had decreased by 80%, relative to a value of 100% for the weight reduction that occurred when the temperature of the liquid composition was raised from 23° C. to 500° C. at a rate of 15° C./minute in a thermogravimetric (TG) analyzer. The thermogravimetric analyzer, the cell and the sample preparation method were the same as those used for the above measurement of the initial boiling point.

[Preparation and Evaluation of Ink Sets]

Using the prepared oil-based inkjet inks K1 to K17, C1 to C12, M1 and Y1, and the prepared treatment liquid 1, the various combinations of two liquids shown in Tables 6 to 10 were prepared as ink sets of Examples 1 to 28 and Comparative Examples 1 to 9. Each of these ink sets was subjected to the evaluations described below. The results are shown in Tables 7 to 11. In Tables 7 to 11, the oil-based inkjet inks K1 to K17, C1 to C12, M1 and Y1, and the oil-based treatment liquid 1 are listed as K1 to K17, C1 to C12, M1 and Y1, and treatment liquid 1 respectively.

<Discharge Stability after Long Idle Period>

The ink supply paths were connected to an inkjet head having the same structure as the inkjet head illustrated in FIG. 1, the ink set from each example and each comparative example was introduced into the inkjet head and then discharged so as to form a solid image (30 pl per pixel, 300×300 dpi) on a plain paper recording medium (Riso Paper IJ, manufactured by Riso Kagaku Corporation), and normal discharge was confirmed. Subsequently, the inkjet head was left idle at room temperature for 3 months. After standing idle for 3 months, the inkjet head was installed in an inkjet printer (Orphis EX9050, manufactured by Riso Kagaku Corporation), a cleaning operation was performed, 500 sheets of a solid image in which a solid image formed from the first liquid and a solid image formed from the second liquid were superimposed were printed (30 pl of each liquid per pixel, 300×300 dpi), and a determination was made as to whether or not white lines (discharge defects) were present in the image.

In the cleaning operation, the paths for supplying the ink to the inkjet heads were pressurized to force the ink from the discharge ports of the inkjet heads (so-called purging), and the inkjet head surfaces were then wiped with the wipers.

The evaluation criteria were as follows.

A: Of the 500 sheets, white lines occurred on 5 sheets or less

B: Of the 500 sheets, white lines occurred on more than 5 sheets but not more than 10 sheets C: Of the 500 sheets, white lines occurred on at least 11 sheets <Satellite Contamination>

The ink supply paths were connected to an inkjet head having the same structure as the inkjet head illustrated in FIG. 1, the ink set from each example and each comparative example was introduced into the inkjet head, the inkjet head was installed in an inkjet printer (Orphis EX9050, manufactured by Riso Kagaku Corporation), one copy of a solid image in which a solid image formed from the first liquid and a solid image formed from the second liquid were superimposed was printed (30 pl of each liquid per pixel, 300×300 dpi) onto a plain paper recording medium (Riso Paper IJ, manufactured by Riso Kagaku Corporation), the edge portions of the solid image were inspected visually, and the degree of satellite contamination was evaluated. The presence or absence of satellites, which are caused when a plurality of very fine liquid droplets (satellites) separate from the main droplet during flight and impact the recording medium at positions different from the impact position of the main droplet, and the degree of such satellite contamination, were evaluated against the following evaluation criteria.

A: no satellite contamination could be detected visually

B: although some satellite contamination could be detected visually, the degree of contamination was minimal, and image coarseness was unobtrusive C: satellite contamination was detected visually, and coarseness of the printed surface was pronounced <Discharge Stability after Short Idle Period>

The ink supply paths were connected to an inkjet head having the same structure as the inkjet head illustrated in FIG. 1, the ink set from each example and each comparative example was introduced into the inkjet head and then discharged so as to form a solid image (30 pl per pixel, 300×300 dpi) on a plain paper recording medium (Riso Paper IJ, manufactured by Riso Kagaku Corporation), and normal discharge was confirmed. Subsequently, the inkjet head was left idle at room temperature for one day. After standing idle for one day, the inkjet head was installed in an inkjet printer (Orphis EX9050, manufactured by Riso Kagaku Corporation), and without performing any cleaning operation, one copy of a fine line chart in which fine lines formed from the first liquid and fine lines formed from the second liquid were superimposed was printed (6 pl of each liquid per pixel, 30 lines were printed at 300×300 dpi with a 1 mm spacing between lines), and the state of discharge in the formed fine lines was evaluated.

The evaluation criteria were as follows.

A: from the first line, no delay or disorder occurred

B: some delay or disorder was observed in the first line, but the second to fifth lines were printed normally C: even at the fifth line, some delay or disorder was observed <Show-Through>

The ink supply paths were connected to an inkjet head having the same structure as the inkjet head illustrated in FIG. 1, the ink set from each example and each comparative example was introduced into the inkjet head, the inkjet head was installed in an inkjet printer (Orphis EX9050, manufactured by Riso Kagaku Corporation), a solid image in which a solid image formed from the first liquid and a solid image formed from the second liquid were superimposed was printed (30 pl of each liquid per pixel, 300×300 dpi) onto a plain paper recording medium (Riso Paper U, manufactured by Riso Kagaku Corporation), and the level of show-through was evaluated visually. The evaluation criteria were as follows A: show-through was not noticeable B: some show-through occurred, but of a permissible level C: show-through at an impermissible level was observed

TABLE 1

| | Product name (manufacturer) | | Ink K1 | Ink C1 | Ink M1 | Ink Y1 | Ink K2 | Ink C2 |
|---|---|---|---|---|---|---|---|---|
| Coloring material | Carbon black MA8 (Mitsubishi Chemical Corporation) | carbon black (PBk 7) | 5 | | | | 5 | |
| | Chromofine 4927 (Dainichiseika Color & Chemicals Mfg. Co., Ltd.) | copper phthalocyanine blue (PB 15:3) | | 5 | | | | 5 |
| | L5B01 (Clariant Japan K.K.) | brilliant carmine 6B (PR 57:1) | | | 5 | | | |
| | Fast yellow HG (Clariant Japan K.K.) | benzimidazolone yellow (PY 180) | | | | 6 | | |
| Extender pigment | Aerosil R972 (Nippon Aerosil Co., Ltd.) | hydrophobic fumed silica | | | | | | |
| Pigment dispersant | Efka 450 (BASF Japan Ltd.) | modified polyacrylate | | | | | | |
| | Solsperse 13940 (The Lubrizol Corporation) | polyesteramine | 5 | 5 | 5 | 5 | 5 | 5 |
| Fatty acid ester-based solvent | Salacos 99 (The Nisshin OilliO Group, Ltd.) | isononyl isononanoate | 50 | 50 | | | | |
| | Exceparl HL (Kao Corporation) | hexyl laurate | | | | | 50 | 49 |
| | IOP (Nikko Chemicals Co., Ltd.) | isooctyl palmitate | | | | | | |
| | Butyl octanoate (Junsei Chemical Co., Ltd.) | butyl octanoate | | | | | | |
| Dibasic acid ester-based solvent | DIDP (Daihachi Chemical Industry Co., Ltd.) | diisodecyl phthalate | | | | | | |
| Glycol ether-based solvent | Butysenol 30 (KH Neochem Co., Ltd.) | triethylene glycol monobutyl ether | | | | | | |
| | Butysenol 40 (KH Neochem Co., Ltd.) | tetraethylene glycol mono-butyl ether | | | | | | |
| Higher alcohol- | Fineoxocol 1600 (Nissan Chemical | isohexadecanol | 20 | 20 | 20 | 20 | | |

TABLE 1-continued

|  | Product name (manufacturer) |  | Ink K1 | Ink C1 | Ink M1 | Ink Y1 | Ink K2 | Ink C2 |
|---|---|---|---|---|---|---|---|---|
| based solvent | Industries, Ltd.) |  |  |  |  |  |  |  |
|  | Fineoxocol 2000 (Nissan Chemical Industries, Ltd.) | isoeicosanol |  |  |  |  | 15 | 15 |
| Petroleum-based hydrocarbon solvent | Exxsol D-130 (TonenGeneral Sekiyu K.K.) |  |  |  |  |  | 75 | 75 |
|  | AF Solvent No. 6 (JX Nippon Oil & Energy Corporation) |  | 20 | 20 | 20 | 20 |  |  |
| Total |  |  | 100 | 100 | 100 | 100 | 100 | 100 |
| Specific gravity |  |  | 0.877 | 0.872 | 0.865 | 0.867 | 0.877 | 0.871 |
| Initial boiling point |  |  | 284 | 286 | 285 | 288 | 265 | 262 |
| 80% distillation temperature |  |  | 309 | 309 | 342 | 342 | 288 | 288 |

TABLE 2

|  | Product name (manufacturer) |  | Ink K3 | Ink C3 | Ink K4 | Ink C4 | Ink K5 | Ink C5 |
|---|---|---|---|---|---|---|---|---|
| Coloring material | Carbon black MA8 (Mitsubishi Chemical Corporation) | carbon black (PBk 7) | 5 |  | 5 |  | 5 |  |
|  | Chromofine 4927 (Dainichiseika Color & Chemicals Mfg. Co., Ltd.) | copper phthalocyanine blue (PB 15:3) |  | 5 |  | 5 |  | 5 |
|  | L5B01(Clariant Japan K.K.) | brilliant carmine 6B (PR 57:1) |  |  |  |  |  |  |
|  | Fast yellow HG (Clariant Japan K.K.) | benzimidazolone yellow (PY 180) |  |  |  |  |  |  |
| Extender pigment | Aerosil R972 (Nippon Aerosil Co., Ltd.) | hydrophobic fumed silica |  |  |  |  |  |  |
| Pigment dispersant | Efka 450 (BASF Japan Ltd.) | modified polyacrylate |  |  |  |  |  |  |
|  | Solsperse 13940 (The Lubrizol Corporation) | polyesteramine | 5 | 5 | 5 | 5 | 5 | 5 |
| Fatty acid ester-based solvent | Salacos 99 (The Nisshin OilliO Group, Ltd.) | isononyl isononanoate |  |  | 80 |  |  |  |
|  | Exceparl HL (Kao Corporation) | hexyl laurate |  |  |  |  |  |  |
|  | IOP (Nikko Chemicals Co., Ltd.) | isooctyl palmitate |  |  |  |  |  |  |
|  | Butyl octanoate (Junsei Chemical Co., Ltd.) | butyl octanoate |  |  |  |  | 50 | 50 |
| Dibasic acid ester-based solvent | DIDP (Daihachi Chemical Industry Co., Ltd.) | diisodecyl phthalate |  |  |  |  |  |  |
| Glycol ether-based solvent | Butysenol 30 (KH Neochem Co., Ltd.) | triethylene glycol monobutyl ether | 50 |  |  |  |  |  |
|  | Butysenol 40 (KH Neochem Co., Ltd.) | tetraethylene glycol mono-butyl ether |  |  | 50 | 50 |  |  |
| Higher alcohol-based solvent | Fineoxocol 1600 (Nissan Chemical Industries, Ltd.) | isohexadecanol | 20 |  |  |  |  |  |
|  | Fineoxocol 2000 (Nissan Chemical Industries, Ltd.) | isoeicosanol |  | 10 |  | 40 | 40 |  |
| Petroleum-based hydrocarbon solvent | Exxsol D-130 (TonenGeneral Sekiyu K.K.) |  |  |  |  |  |  |  |
|  | AF Solvent No. 6 (JX Nippon Oil & Energy Corporation) |  | 20 |  |  |  | 40 | 40 |
| Total |  |  | 100 | 100 | 100 | 100 | 100 | 100 |
| Specific gravity |  |  | 0.944 | 0.871 | 0.967 | 0.960 | 0.882 | 0.876 |
| Initial boiling point |  |  | 269 | 286 | 303 | 304 | 242 | 243 |
| 80% distillation temperature |  |  | 309 | 289 | 332 | 332 | 314 | 314 |

50

TABLE 3

|  | Product name (manufacturer) |  | Ink K6 | Ink C6 | Ink K7 | Ink C7 | Ink K8 | Ink C8 | Ink K9 | Ink C9 |
|---|---|---|---|---|---|---|---|---|---|---|
| Coloring material | Carbon black MA8 (Mitsubishi Chemical Corporation) | carbon black (PBk 7) | 5 |  | 10 |  | 2 |  | 5 |  |
|  | Chromofine 4927 (Dainichiseika Color & Chemicals Mfg. Co., Ltd.) | copper phthalocyanine blue (PB 15:3) |  | 5 |  | 10 |  | 2 |  | 5 |
|  | L5B01(Clariant Japan K.K.) | brilliant carmine 6B (PR 57:1) |  |  |  |  |  |  |  |  |
|  | Fast yellow HG (Clariant Japan K.K.) | benzimidazolone yellow (PY 180) |  |  |  |  |  |  |  |  |
| Extender pigment | Aerosil R972 (Nippon Aerosil Co., Ltd.) | hydrophobic fumed silica |  |  |  |  |  |  |  |  |

TABLE 3-continued

| | Product name (manufacturer) | | Ink K6 | Ink C6 | Ink K7 | Ink C7 | Ink K8 | Ink C8 | Ink K9 | Ink C9 |
|---|---|---|---|---|---|---|---|---|---|---|
| Pigment dispersant | Efka 450 (BASF Japan Ltd.) | modified polyacrylate | | | | | 1 | 1 | | |
| | Solsperse 13940 (The Lubrizol Corporation) | polyesteramine | 5 | 5 | 5 | 5 | | | 5 | 5 |
| Fatty acid ester-based solvent | Salacos 99 (The Nisshin OilliO Group, Ltd.) | isononyl isononanoate | | | 45 | 45 | 57 | 57 | | |
| | Exceparl HL (Kao Corporation) | hexyl laurate | | | | | | | | |
| | IOP (Nikko Chemicals Co., Ltd.) | isooctyl palmitate | | | | | | | | |
| | Butyl octanoate (Junsei Chemical Co., Ltd.) | butyl octanoate | | | | | | | | |
| Dibasic acid ester-based solvent | DIDP (Daihachi Chemical Industry Co., Ltd.) | diisodecyl phthalate | | | | | | | 30 | 30 |
| Glycol ether-based solvent | Butysenol 30 (KH Neochem Co., Ltd.) | triethylene glycol monobutyl ether | | | | | | | | |
| | Butysenol 40 (KH Neochem Co., Ltd.) | tetraethylene glycol monobutyl ether | | | | | | | | |
| Higher alcohol-based solvent | Fineoxocol 1600 (Nissan Chemical Industries, Ltd.) | isohexadecanol | | | 20 | 20 | 20 | 20 | 10 | 10 |
| | Fineoxocol 2000 (Nissan Chemical Industries, Ltd.) | isoeicosanol | 20 | 20 | | | | | | |
| Petroleum-based hydrocarbon solvent | Exxsol D-130 (TonenGeneral Sekiyu K.K.) | | | | | | | | | |
| | AF Solvent No. 6 (JX Nippon Oil & Energy Corporation) | | 70 | 70 | 20 | 20 | 20 | 20 | 50 | 50 |
| Total | | | 100 | 100 | 100 | 100 | 100 | 100 | 100 | 100 |
| Specific gravity | | | 0.851 | 0.845 | 0.900 | 0.894 | 0.853 | 0.847 | 0.903 | 0.894 |
| Initial boiling point | | | 295 | 297 | 285 | 286 | 284 | 284 | 305 | 303 |
| 80% distillation temperature | | | 327 | 327 | 309 | 309 | 309 | 309 | 428 | 428 |

TABLE 4

| | Product name (manufacturer) | | Ink K10 | Ink C10 | Ink K11 | Ink C11 |
|---|---|---|---|---|---|---|
| Coloring material | Carbon black MA8 (Mitsubishi Chemical Corporation) | carbon black (PBk 7) | 5 | | 5 | |
| | Chromofine 4927 (Dainichiseika Color & Chemicals Mfg. Co., Ltd.) | copper phthalocyanine blue (PB 15:3) | | 5 | | 5 |
| | L5B01 (Clariant Japan K.K.) | brilliant carmine 6B (PR 57:1) | | | | |
| | Fast yellow HG (Clariant Japan K.K.) | benzimidazolone yellow (PY 180) | | | | |
| Extender pigment | Aerosil R972 (Nippon Aerosil Co., Ltd.) | hydrophobic fumed silica | | | | |
| Pigment dispersant | Efka 450 (BASF Japan Ltd.) | modified polyacrylate | 5 | 5 | | |
| | Solsperse 13940 (The Lubrizol Corporation) | polyesteramine | | | 5 | 5 |
| Fatty acid ester-based solvent | Salacos 99 (The Nisshin OilliO Group, Ltd.) | isononyl isononanoate | | | 40 | 40 |
| | Exceparl HL (Kao Corporation) | hexyl laurate | 45 | 45 | | |
| | IOP (Nikko Chemicals Co., Ltd.) | isooctyl palmitate | | | | |
| | Butyl octanoate (Junsei Chemical Co., Ltd.) | butyl octanoate | | | | |
| Dibasic acid ester-based solvent | DIDP (Daihachi Chemical Industry Co., Ltd.) | diisodecyl phthalate | | | 10 | 10 |
| Glycol ether-based solvent | Butysenol 30 (KH Neochem Co., Ltd.) | triethylene glycol monobutyl ether | | | | |
| | Butysenol 40 (KH Neochem Co., Ltd.) | tetraethylene glycol monobutyl ether | | | | |
| Higher alcohol-based solvent | Fineoxocol 1600 (Nissan Chemical Industries, Ltd.) | isohexadecanol | 15 | 15 | | |
| | Fineoxocol 2000 (Nissan Chemical Industries, Ltd.) | isoeicosanol | | | | |
| Petroleum-based hydrocarbon solvent | Exxsol D-130 (TonenGeneral Sekiyu K.K.) | | | | | |
| | AF Solvent No. 6 (JX Nippon Oil & Energy Corporation) | | 30 | 30 | 40 | 40 |
| Total | | | 100 | 100 | 100 | 100 |
| Specific gravity | | | 0.862 | 0.857 | 0.876 | 0.865 |
| Initial boiling point | | | 301 | 299 | 301 | 305 |
| 80% distillation temperature | | | 341 | 341 | 319 | 319 |

TABLE 5

| | Product name (manufacturer) | | Ink K12 | Ink C12 | Ink K13 | Ink K14 |
|---|---|---|---|---|---|---|
| Coloring material | Carbon black MA8 (Mitsubishi Chemical Corporation) | carbon black (PBk 7) | 5 | | 5 | 5 |
| | Chromofine 4927 (Dainichiseika Color & Chemicals Mfg. Co., Ltd.) | copper phthalocyanine blue (PB 15:3) | | 5 | | |
| | L5B01 (Clariant Japan K.K.) | brilliant carmine 6B (PR 57:1) | | | | |
| | Fast yellow HG (Clariant Japan K.K.) | benzimidazolone yellow (PY 180) | | | | |
| Extender pigment | Aerosil R972 (Nippon Aerosil Co., Ltd.) | hydrophobic fumed silica | | | | |
| Pigment dispersant | Efka 450 (BASF Japan Ltd.) | modified polyacrylate | | | | |
| | Solsperse 13940 (The Lubrizol Corporation) | polyesteramine | 5 | 5 | 5 | 5 |
| Fatty acid ester-based solvent | Salacos 99 (The Nisshin OilliO Group, Ltd.) | isononyl isononanoate | | | 40 | 35 |
| | Exceparl HL (Kao Corporation) | hexyl laurate | | | | |
| | IOP (Nikko Chemicals Co., Ltd.) | isooctyl palmitate | | | 10 | 15 |
| | Butyl octanoate (Junsei Chemical Co., Ltd.) | butyl octanoate | | | | |
| Dibasic acid ester-based solvent | DIDP (Daihachi Chemical Industry Co., Ltd.) | diisodecyl phthalate | | | | |
| Glycol ether-based solvent | Butysenol 30 (KH Neochem Co., Ltd.) | triethylene glycol monobutyl ether | | | | |
| | Butysenol 40 (KH Neochem Co., Ltd.) | tetraethylene glycol monobutyl ether | | | | |
| Higher alcohol-based solvent | Fineoxocol 1600 (Nissan Chemical Industries, Ltd.) | isohexadecanol | | | 20 | 20 |
| | Fineoxocol 2000 (Nissan Chemical Industries, Ltd.) | isoeicosanol | | | | |
| Petroleum-based hydrocarbon solvent | Exxsol D-130 (TonenGeneral Sekiyu K.K.) | | | | | |
| | AF Solvent No. 6 (JX Nippon Oil & Energy Corporation) | | 90 | 90 | 20 | 20 |
| Total | | | 100 | 100 | 100 | 100 |
| Specific gravity | | | 0.842 | 0.836 | 0.877 | 0.877 |
| Initial boiling point | | | 296 | 296 | 286 | 286 |
| 80% distillation temperature | | | 319 | 319 | 312 | 321 |

TABLE 6

| | Product name (manufacturer) | | Ink K15 | Ink K16 | Ink K17 | Treatment liquid 1 |
|---|---|---|---|---|---|---|
| Coloring material | Carbon black MA8 (Mitsubishi Chemical Corporation) | carbon black (PBk 7) | 5 | 5 | 5 | |
| | Chromofine 4927 (Dainichiseika Color & Chemicals Mfg. Co., Ltd.) | copper phthalocyanine blue (PB 15:3) | | | | |
| | L5B01 (Clariant Japan K.K.) | brilliant carmine 6B (PR 57:1) | | | | |
| | Fast yellow HG (Clariant Japan K.K.) | benzimidazolone yellow (PY 180) | | | | |
| Extender pigment | Aerosil R972 (Nippon Aerosil Co., Ltd.) | hydrophobic fumed silica | | | | 5 |
| Pigment dispersant | Efka 450 (BASF Japan Ltd.) | modified polyacrylate | | | | |
| | Solsperse 13940 (The Lubrizol Corporation) | polyesteramine | 5 | 5 | 5 | 5 |
| Fatty acid ester-based solvent | Salacos 99 (The Nisshin OilliO Group, Ltd.) | isononyl isononanoate | 30 | 25 | | 50 |
| | Exceparl HL (Kao Corporation) | hexyl laurate | | | | |
| | IOP (Nikko Chemicals Co., Ltd.) | isooctyl palmitate | 20 | 25 | 90 | |
| | Butyl octanoate (Junsei Chemical Co., Ltd.) | butyl octanoate | | | | |
| Dibasic acid ester-based solvent | DIDP (Daihachi Chemical Industry Co., Ltd.) | diisodecyl phthalate | | | | |
| Glycol ether-based solvent | Butysenol 30 (KH Neochem Co., Ltd.) | triethylene glycol monobutyl ether | | | | |
| | Butysenol 40 (KH Neochem Co., Ltd.) | tetraethylene glycol monobutyl ether | | | | |
| Higher alcohol-based solvent | Fineoxocol 1600 (Nissan Chemical Industries, Ltd.) | isohexadecanol | 20 | 20 | | 20 |
| | Fineoxocol 2000 (Nissan Chemical Industries, Ltd.) | isoeicosanol | | | | |
| Petroleum-based hydrocarbon solvent | Exxsol D-130 (TonenGeneral Sekiyu K.K.) | | | | | |
| | AF Solvent No. 6 (JX Nippon Oil & Energy Corporation) | | 20 | 20 | | 20 |

TABLE 6-continued

| Product name (manufacturer) | Ink K15 | Ink K16 | Ink K17 | Treatment liquid 1 |
|---|---|---|---|---|
| Total | 100 | 100 | 100 | 100 |
| Specific gravity | 0.878 | 0.878 | 0.862 | 0.885 |
| Initial boiling point | 286 | 286 | 406 | 285 |
| 80% distillation temperature | 415 | 415 | 409 | 309 |

TABLE 7

|  | Example 1 | Example 2 | Example 3 | Example 4 | Example 5 | Example 6 | Example 7 |
|---|---|---|---|---|---|---|---|
| First liquid | K1 | K1 | K1 | C1 | C1 | K4 | K6 |
| Specific gravity | 0.877 | 0.877 | 0.877 | 0.872 | 0.872 | 0.967 | 0.851 |
| Initial boiling point | 284 | 284 | 284 | 286 | 286 | 303 | 295 |
| 80% distillation temperature | 309 | 309 | 309 | 309 | 309 | 332 | 327 |
| Second liquid | C1 | M1 | Y1 | M1 | Y1 | C4 | C6 |
| Specific gravity | 0.872 | 0.865 | 0.867 | 0.865 | 0.867 | 0.960 | 0.845 |
| Initial boiling point | 286 | 285 | 288 | 285 | 288 | 304 | 297 |
| 80% distillation temperature | 309 | 342 | 342 | 342 | 342 | 332 | 327 |
| Specific gravity difference | 0.005 | 0.012 | 0.010 | 0.007 | 0.005 | 0.007 | 0.006 |
| Discharge stability after long idle period | B | B | B | B | B | A | A |
| Satellite contamination | A | B | B | A | A | A | A |
| Discharge stability after short idle period | A | A | A | A | A | A | A |
| Show-through | A | A | A | A | A | A | A |

TABLE 8

|  | Example 8 | Example 9 | Example 10 | Example 11 | Example 12 | Example 13 | Example 14 |
|---|---|---|---|---|---|---|---|
| First liquid | K6 | C8 | K9 | K10 | K11 | K12 | K7 |
| Specific gravity | 0.851 | 0.847 | 0.903 | 0.862 | 0.876 | 0.842 | 0.900 |
| Initial boiling point | 295 | 284 | 305 | 301 | 301 | 296 | 285 |
| 80% distillation temperature | 327 | 309 | 428 | 341 | 319 | 319 | 309 |
| Second liquid | K10 | C12 | C9 | C10 | C11 | C12 | C7 |
| Specific gravity | 0.862 | 0.836 | 0.894 | 0.857 | 0.865 | 0.836 | 0.894 |
| Initial boiling point | 301 | 296 | 303 | 299 | 305 | 296 | 286 |
| 80% distillation temperature | 341 | 319 | 428 | 341 | 319 | 319 | 309 |
| Specific gravity difference | 0.011 | 0.011 | 0.009 | 0.005 | 0.011 | 0.006 | 0.006 |
| Discharge stability after long idle period | A | B | A | A | A | A | B |
| Satellite contamination | B | B | B | A | B | A | B |
| Discharge stability after short idle period | A | A | A | A | A | A | A |
| Show-through | A | A | B | A | A | A | A |

TABLE 9

|  | Example 15 | Example 16 | Example 17 | Example 18 | Example 19 | Example 20 | Example 21 |
|---|---|---|---|---|---|---|---|
| First liquid | K8 | K11 | K6 | K10 | K11 | K8 | K6 |
| Specific gravity | 0.853 | 0.876 | 0.851 | 0.862 | 0.876 | 0.853 | 0.851 |
| Initial boiling point | 284 | 301 | 295 | 301 | 301 | 284 | 295 |
| 80% distillation temperature | 309 | 319 | 327 | 341 | 319 | 309 | 327 |
| Second liquid | C8 | M1 | C10 | C1 | Y1 | C11 | K12 |
| Specific gravity | 0.847 | 0.865 | 0.857 | 0.872 | 0.867 | 0.865 | 0.842 |
| Initial boiling point | 284 | 285 | 299 | 286 | 288 | 305 | 296 |
| 80% distillation temperature | 309 | 342 | 341 | 309 | 342 | 319 | 319 |
| Specific gravity difference | 0.006 | 0.011 | 0.006 | 0.010 | 0.009 | 0.012 | 0.009 |
| Discharge stability after long idle period | B | B | A | B | B | B | A |
| Satellite contamination | A | B | A | B | A | B | A |
| Discharge stability after short idle period | A | A | A | A | A | A | A |
| Show-through | A | A | A | A | A | A | A |

TABLE 10

|  | Example 22 | Example 23 | Example 24 | Example 25 | Example 26 | Example 27 | Example 28 |
|---|---|---|---|---|---|---|---|
| First liquid | C10 | K13 | K14 | K15 | K16 | K1 | K1 |
| Specific gravity | 0.857 | 0.877 | 0.877 | 0.878 | 0.878 | 0.877 | 0.877 |
| Initial boiling point | 299 | 286 | 286 | 286 | 286 | 284 | 284 |
| 80% distillation temperature | 341 | 312 | 321 | 415 | 415 | 309 | 309 |
| Second liquid | C11 | C1 | C1 | C1 | C1 | C3 | treatment liquid 1 |
| Specific gravity | 0.865 | 0.872 | 0.872 | 0.872 | 0.872 | 0.871 | 0.885 |
| Initial boiling point | 305 | 286 | 286 | 286 | 286 | 286 | 285 |
| 80% distillation temperature | 319 | 309 | 309 | 309 | 309 | 289 | 309 |
| Specific gravity difference | 0.008 | 0.005 | 0.005 | 0.006 | 0.006 | 0.006 | 0.008 |
| Discharge stability after long idle period | A | B | B | B | B | B | B |
| Satellite contamination | A | A | A | A | A | A | A |
| Discharge stability after short idle period | A | A | A | A | A | B | A |
| Show-through | A | A | A | B | B | A | A |

TABLE 11

|  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|
| First liquid | M1 | M1 | K1 | K2 | K5 | K2 | K3 | K7 | K17 |
| Specific gravity | 0.865 | 0.865 | 0.877 | 0.877 | 0.882 | 0.877 | 0.944 | 0.900 | 0.862 |
| Initial boiling point | 285 | 285 | 284 | 265 | 242 | 265 | 269 | 285 | 406 |
| 80% distillation temperature | 342 | 342 | 309 | 288 | 314 | 288 | 309 | 309 | 409 |
| Second liquid | Y1 | C6 | C4 | C2 | C1 | C5 | C5 | C8 | C9 |
| Specific gravity | 0.867 | 0.845 | 0.960 | 0.871 | 0.872 | 0.876 | 0.876 | 0.847 | 0.894 |
| Initial boiling point | 288 | 297 | 304 | 262 | 286 | 243 | 243 | 284 | 303 |
| 80% distillation temperature | 342 | 327 | 332 | 288 | 309 | 314 | 314 | 309 | 428 |
| Specific gravity difference | 0.002 | 0.020 | 0.083 | 0.006 | 0.010 | 0.001 | 0.068 | 0.053 | 0.032 |
| Discharge stability after long idle period | C | B | B | C | C | C | C | B | A |
| Satellite contamination | A | C | C | A | B | A | C | C | C |
| Discharge stability after short idle period | A | A | A | B | A | B | A | A | A |
| Show-through | A | A | A | A | A | A | A | A | B |

As shown in the tables, in the oil-based inkjet ink sets of Examples 1 to 28, in which the initial boiling points of the liquid compositions (the first liquid and second liquid in the tables) of the oil-based inkjet ink set are all 280° C. or higher, and the difference in the specific gravities of the liquid compositions is at least 0.005, impact defects caused by satellites (satellite contamination) is suppressed, enabling favorable image quality to be obtained, and the discharge stability after a long idle period is also favorable.

In contrast, in the oil-based inkjet ink sets of Comparative Examples 4 to 6, which include a liquid composition with an initial boiling point of less than 280° C. in the oil-based inkjet ink set, the discharge stability deteriorates after a long idle period. It is thought that because the non-aqueous solvent in the liquid composition evaporates more readily, solid aggregates can form more easily, meaning that even if a cleaning operation is performed, restoring normal discharge is more difficult.

Further, in the oil-based inkjet ink sets of Comparative Examples 1 and 6, in which the difference in the specific gravities of the liquid compositions is less than 0.005, the discharge stability deteriorates after a long idle period. It is thought that this is because the inks are more likely to mix and form aggregates.

In the oil-based inkjet ink sets of Comparative examples 2, 3 and 7 to 9, in which the difference in the specific gravities of the liquid compositions is greater than 0.012, the occurrence of impact defects caused by satellites (satellite contamination) increases, and the image quality deteriorates. It is thought that because the difference in the specific gravities of the liquid compositions is large, the discharge speeds vary considerably, resulting in an increase in impact defects caused by satellites (satellite contamination) in the ink having the higher discharge speed.

As is evident from a comparison of Examples 25 and 26 with Examples 23 and 24, and a comparison of Example 1 and Example 27, in those cases where all of the liquid compositions in the oil-based inkjet ink set have an 80% distillation temperature in a range from 300 to 350° C., the evaluation results for the discharge stability after a long idle period and satellite contamination are favorable, and the evaluation results for the discharge stability after a short idle period and show-through also improve.

In the oil-based inkjet ink sets of Examples 10 and 14, in which the specific gravities of the liquid compositions in the oil-based inkjet ink are all greater than 0.890, the result for satellite contamination is B, whereas in those examples in which the specific gravities of the liquid compositions in the oil-based inkjet ink are all 0.890 or less, satellite contamination is better suppressed, and a more favorable image tends to be obtained.

According to embodiments of the present invention, it is possible to provide an oil-based inkjet ink set comprising two or more liquid compositions including an oil-based inkjet ink, wherein even when the two or more liquids are discharged from an inkjet head having two or more discharge port arrays, the accumulation of aggregates on the head surface of the inkjet head can be reduced, enabling the inkjet head to exhibit favorable discharge stability even after standing idle for a long period, and enabling favorable image quality to be achieved with reduced impact defects caused by satellites (satellite contamination), and also to provide a method for producing a printed item using this oil-based inkjet ink set.

Embodiments of the present invention include the oil-based inkjet ink set and the method for producing a printed item described below. However, the present invention is not limited to the following embodiments.

<1> An oil-based inkjet ink set comprising two or more liquid compositions, for use with an inkjet head having two or more discharge port arrays, wherein at least one of the two or more liquid compositions is an oil-based inkjet ink, the initial boiling point of each of the two or more liquid compositions is, independently, 280° C. or higher, and the difference in the specific gravities of any pair of liquid compositions in the two or more liquid compositions is at least 0.005 but not more than 0.012.

<2> The oil-based inkjet ink set according to <1>, wherein the specific gravity of each of the two or more liquid compositions is, independently, 0.890 or less.

<3> The oil-based inkjet ink set according to <1> or <2>, wherein the 80% distillation temperature of each of the two or more liquid compositions is, independently, from 300 to 350° C.

<4> A method for producing a printed item that includes discharging two or more liquid compositions from an inkjet head having two or more discharge port arrays onto a recording medium, wherein at least one of the two or more liquid compositions is an oil-based inkjet ink, the initial boiling point of each of the two or more liquid compositions is, independently, 280° C. or higher, and the difference in the specific gravities of any pair of liquid compositions in the two or more liquid compositions is at least 0.005 but not more than 0.012.

It is to be noted that, besides those already mentioned above, many modifications and variations of the above embodiments may be made without departing from the novel and advantageous features of the present invention. Accordingly, all such modifications and variations are intended to be included in the scope of the appended claims.

What is claimed is:

1. An oil-based inkjet ink set comprising two or more liquid compositions, for use with an inkjet head having two or more discharge port arrays, wherein at least one of the two or more liquid compositions is an oil-based inkjet ink, an initial boiling point of each of the two or more liquid compositions is, independently, 280° C. or higher, and a difference in specific gravities of any pair of liquid compositions in the two or more liquid compositions is at least 0.005 but not more than 0.012.

2. The oil-based inkjet ink set according to claim 1, wherein an 80% distillation temperature of each of the two or more liquid compositions is, independently, from 300 to 350° C.

3. The oil-based inkjet ink set according to claim 1, wherein a specific gravity of each of the two or more liquid compositions is, independently, 0.890 or less.

4. A method for producing a printed item, the method comprising discharging two or more liquid compositions from an inkjet head having two or more discharge port arrays onto a recording medium, wherein at least one of the two or more liquid compositions is an oil-based inkjet ink, an initial boiling point of each of the two or more liquid compositions is, independently, 280° C. or higher, and a difference in specific gravities of any pair of liquid compositions in the two or more liquid compositions is at least 0.005 but not more than 0.012.

5. The method for producing a printed item according to claim 4, wherein an 80% distillation temperature of each of the two or more liquid compositions is, independently, from 300 to 350° C.

6. The method for producing a printed item according to claim 4, wherein a specific gravity of each of the two or more liquid compositions is, independently, 0.890 or less.

* * * * *